(12) United States Patent
Chih et al.

(10) Patent No.: US 11,118,654 B2
(45) Date of Patent: Sep. 14, 2021

(54) APPARATUS FOR TIMELY AND SECURELY LOCKING AND RELEASING A ROPE

(71) Applicants: Ti-An Chih, Changhua Hsien (TW); Ti-Fan Shih, Changhua Hsien (TW)

(72) Inventors: Ti-An Chih, Changhua Hsien (TW); Ti-Fan Shih, Changhua Hsien (TW)

(*) Notice: Subject to any disclaimer, the term of this patent is extended or adjusted under 35 U.S.C. 154(b) by 0 days.

(21) Appl. No.: 16/861,067

(22) Filed: Apr. 28, 2020

(65) Prior Publication Data
US 2020/0347910 A1 Nov. 5, 2020

(30) Foreign Application Priority Data
May 1, 2019 (TW) .................................. 108205388
May 1, 2019 (TW) .................................. 108205389

(51) Int. Cl.
*F16G 11/10* (2006.01)
*F16G 11/14* (2006.01)

(52) U.S. Cl.
CPC .......... *F16G 11/105* (2013.01); *F16G 11/146* (2013.01)

(58) Field of Classification Search
CPC . B66D 5/16; F16G 11/00; F16G 11/04; F16G 11/105; F16G 11/146
See application file for complete search history.

(56) References Cited

U.S. PATENT DOCUMENTS

| 3,099,055 | A | * | 7/1963 | Huber | B61D 45/00 410/103 |
|---|---|---|---|---|---|
| 4,541,149 | A | * | 9/1985 | Jensen | B63B 21/08 24/134 R |
| 4,716,630 | A | * | 1/1988 | Skyba | F16G 11/106 24/134 KB |
| 4,878,270 | A | * | 11/1989 | Westerkamp | F16G 11/04 24/132 R |
| 5,271,127 | A | * | 12/1993 | Christensen | B60P 7/0823 24/16 R |
| 7,076,844 | B2 | * | 7/2006 | Skyba | F16G 11/106 24/134 R |
| 8,881,349 | B2 | * | 11/2014 | Mulholland | F16G 11/106 24/301 |
| 9,199,571 | B2 | * | 12/2015 | Leung | B60P 7/0823 |
| 2005/0205852 | A1 | * | 9/2005 | Stone | B63B 21/08 254/216 |
| 2009/0188753 | A1 | * | 7/2009 | Liang | A63B 27/00 182/133 |

(Continued)

*Primary Examiner* — Robert Sandy
*Assistant Examiner* — David M Upchurch
(74) *Attorney, Agent, or Firm* — Guice Patents PLLC

(57) ABSTRACT

An apparatus for timely and securely locking and releasing a rope includes a housing having an interior space and a communication portion for entering a rope into the housing. The housing includes an abutment portion fixed into the housing, a rotatable cam configured to be corresponsive to the abutment portion and pivotally connected to an inner side of one of the side panels, an elastic member installed between the side panel and the cam, and a rotatable start portion having an engagement surface and a first engagement portion. The rotatable start portion is configured to be corresponsive to an end of the cam and pivotally connected to an end of an inner side of one of the side panels, and an end of the start portion has a second engagement portion corresponding to the first engagement portion.

18 Claims, 6 Drawing Sheets

(56) References Cited

U.S. PATENT DOCUMENTS

| | | | | |
|---|---|---|---|---|
| 2012/0000043 | A1* | 1/2012 | Maire | B60P 7/0838 |
| | | | | 24/68 CD |
| 2013/0092480 | A1* | 4/2013 | Lavoie | B66D 5/16 |
| | | | | 188/65.1 |
| 2017/0113072 | A1* | 4/2017 | Sepe | A62B 1/14 |
| 2018/0340592 | A1* | 11/2018 | Truesdell | F16G 11/146 |
| 2019/0200710 | A1* | 7/2019 | Ben-Arie | A43C 11/14 |
| 2019/0376580 | A1* | 12/2019 | Oldiges | F16G 11/106 |

\* cited by examiner

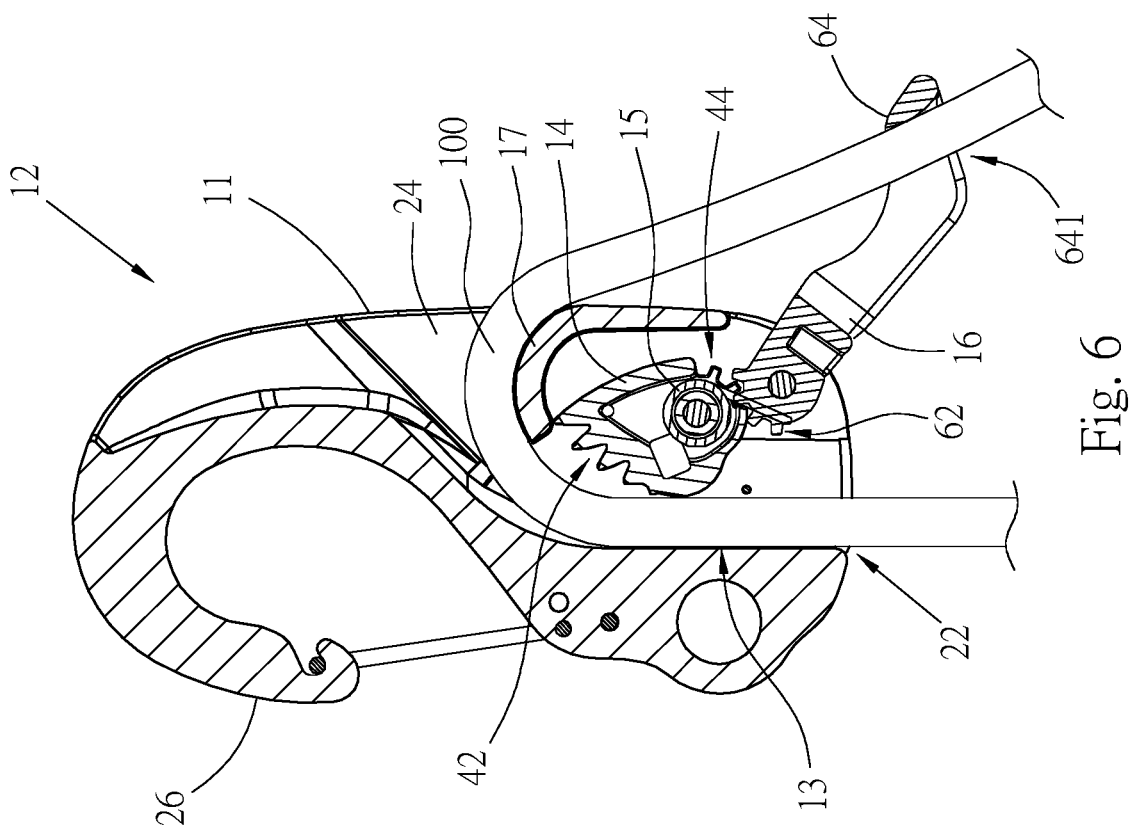
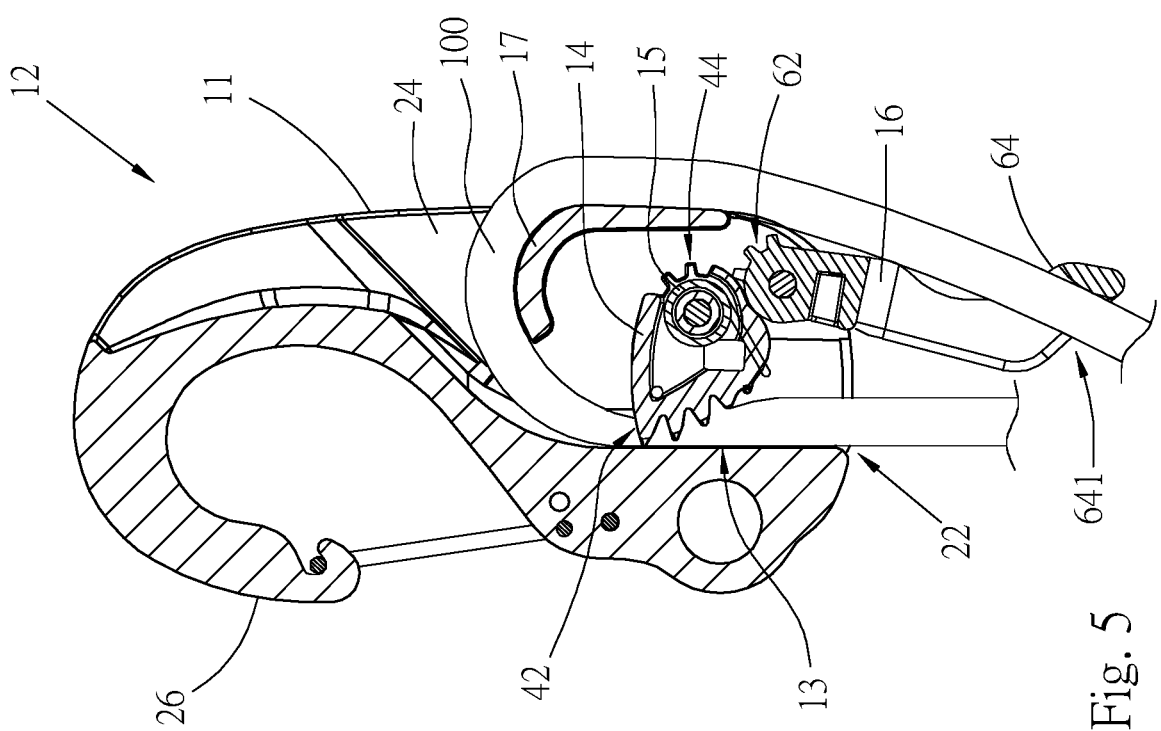

APPARATUS FOR TIMELY AND SECURELY LOCKING AND RELEASING A ROPE

FIELD OF INVENTION

The present invention relates to the technical field of an apparatus of grabbing a rope, and more particularly to an apparatus for timely and securely locking and releasing a rope.

BACKGROUND OF INVENTION

Description of the Related Art

There are various different apparatuses used indoors, outdoors, trucks, camps, or yachts for grabbing a rope. For example, one of these apparatuses is a cam cleat that simply grabs a rope, and the other one is a clutch that allows a rope to be released while the rope is still holding a load. The cam cleat remains fixed and still (and cannot move immediately) and the rope is operated in a single direction to pull the rope tightly and thus the rope cannot be released regressively. The clutch also remains fixed and still (and cannot move immediately), and the rope is operated in a single direction to pull the rope tightly and thus the rope cannot be released regressively. In addition, the clutch has a handle, and the range of operating the handle is approximately equal to 180 degrees, so that the application is inconvenient.

Most apparatuses for lifting an object pass a rope to a fixed pulley or assemble the fixed pulley to a movable pulley in order to lift the object. Further, a structure for stopping the rope is installed for locking and releasing the rope immediately. As disclosed in U.S. Pat. No. 6,685,171, a pulley is installed, and when a rotable pawl and an engaging surface are used to lift the object, the rope can be locked immediately, and an arm extending outwardly from the rotable pawl to an appropriate length is provided, so that if a user swings the rope biasedly and applies a force to push the arm, the rope can be locked immediately when the object is descended, but when the object is descended (or the rope is released), the rotable pawl will approach the engaging surface. In other words, the rope will rob the pawl to produce an unsmooth operation during the process of releasing the rope. Further, products adopting the aforementioned patent are unable to release a hanged object having a weight less than 2.25 kg.

In a conventional auxiliary tool for locking a rope or fastening a tightened rope as disclosed in U.S. Pat. Nos. 7,428,769 and 8, 141, 212, a V-shaped groove is formed on an exterior side surface of a housing, and the inner wall of the V-shaped groove has a plurality of parallel oblique ridges. When a tensioned (tightened) rope is passed in and out of the housing, the exposed rope can be crammed into the V-shaped groove to achieve the effect of fastening the rope, and such structure is capable of tying a tightened rope quickly and easily, but it cannot tie a rope with a too large tension. Furthermore, after rope is fixed, the rope may sometimes slip out from the V-shaped groove. For example, a rope is used to tie goods in a truck by the aforementioned tool, and when the truck is traveling, the goods are shaken, so that the rope is loosened.

SUMMARY OF THE INVENTION

To overcome the aforementioned drawback of the prior art, it is a primary object of the present invention to provide an apparatus for timely and securely locking and releasing a rope, and the apparatus can lift and release a heavy object smoothly and safely.

Another objective of the present invention is to provide an apparatus for timely and securely locking and releasing a rope, and the apparatus can maintained the locked status of the rope effectively.

A further objective of the present invention is to provide an apparatus for timely and securely locking and releasing a rope, and the apparatus can pull a rope tightly.

To achieve the aforementioned and other objectives, the present invention discloses an apparatus for timely and securely locking and releasing a rope, comprising: a housing having an interior space and a communication portion for entering/retracting the rope into/from the housing; an abutment portion; a rotatable cam; an elastic member; and a rotable start portion, wherein the abutment portion is fixed into the interior space of the housing, and the rotatable cam is configured to be corresponsive to the abutment portion and pivotally coupled to an inner side of one of the side panels, and the rotatable cam has an engagement surface and a first engagement portion, and the elastic member is installed between the side panel and the cam, and the rotable start portion is configured to be corresponsive to an end of the cam and pivotally coupled to an end of an inner side of one of the side panels, and an end of the start portion has a second engagement portion configured to be corresponsive to the first engagement portion. The present invention has the effect of locking and releasing a rope situated between the abutment portion and the engagement surface timely.

To make it easier for our examiner to understand the objective of the invention, its structure, innovative features, and performance, we use a preferred embodiment together with the attached drawings for the detailed description of the invention.

BRIEF DESCRIPTION OF THE DRAWINGS

FIG. 5 is a front view showing the rope of FIG. 4 passed and installed to a force applying portion of the start portion;

FIG. 6 is a front view showing the rope of FIG. 5 forced to deflect the engagement surface and the start portion;

DESCRIPTION OF THE PREFERRED EMBODIMENTS

Figure 2:
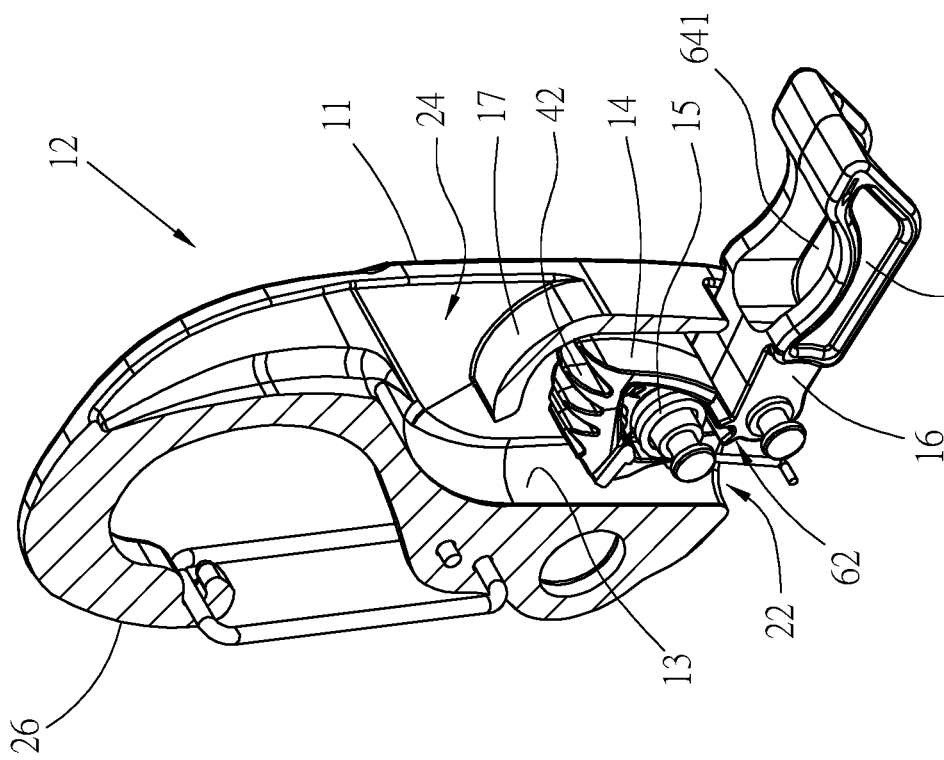
FIG. 2 is a perspective view of an apparatus in accordance with the first preferred embodiment of the present invention after a side panel is cut, so that an engagement surface is situated at a first position and a start portion is situated at a third position.
Figure 1:
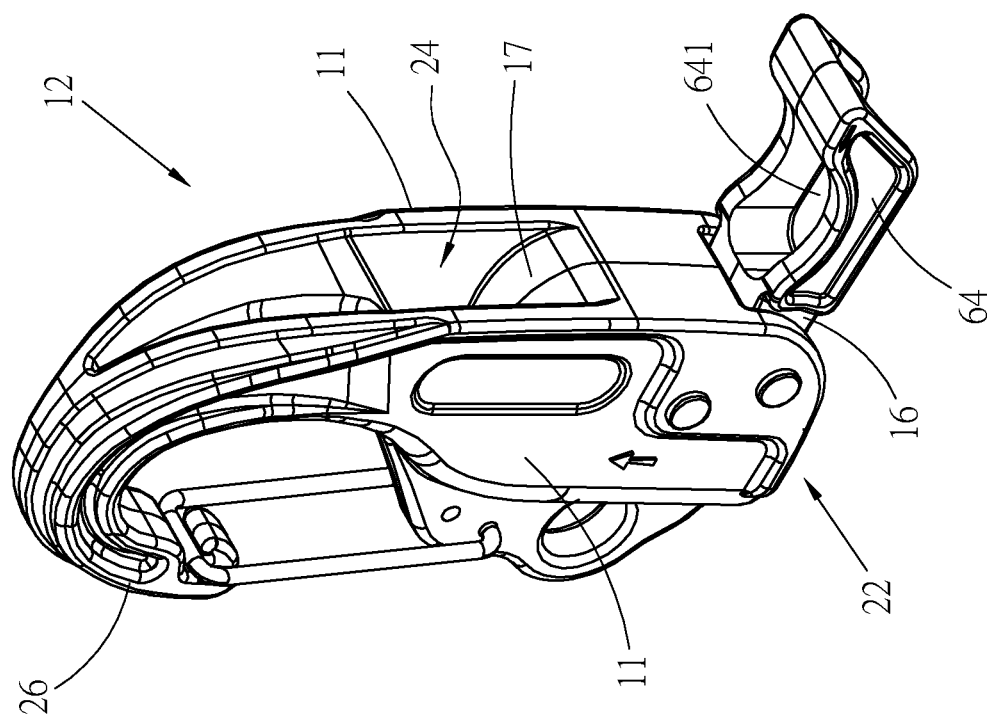
FIG. 1 is a perspective view of an apparatus in accordance with a first preferred embodiment of the present invention.

With reference to FIGS. 1 to 4 for an apparatus for timely and securely locking and releasing a rope of the present invention, the apparatus comprises a housing (12), an abutment portion (13), a rotatable cam (14), an elastic member (15), and a rotatable start portion (16).

The housing (12) is formed with an interior space by two side panels (11) coupled correspondingly with each other, or integrally formed, and the housing (12) comprises two openings (22)(24) for entering/retracting a rope (100) into/from the housing (12), and an end of the housing (12) has a hook portion (26) for hooking and fixing a support portion such as a hook (not shown in the figure) to a wall, a ceiling or a column to attach onto the wall, the ceiling or the column, or the hook portion (26) is not provided, but a screw is passed and installed to the housing (12) in order to lock onto the wall, the ceiling or the column.

The abutment portion (13) is fixed to a middle position of an inner side of one of the side panels (11) or formed by a portion of the inner wall of the housing (12), wherein the abutment portion (13) can be a rough surface or a smooth surface, and the abutment portion (13) may also be formed by at least one ratchet (not shown in the figure) to provide better friction for retardation or stop.

The rotatable cam (14) is configured to be corresponsive to the abutment portion (13) and pivotally coupled to an inner side of the side panels (11), and the rotatable cam (14) has an engagement surface (42) and a first engagement portion (44), and the engagement surface (42) is partitioned correspondingly with the abutment portion (13) and swings between a first position and a second position, and the first engagement portion (44) is disposed at an end of the cam (14), wherein the cam (14) is pivotally coupled to the side panels (11) by using an eccentric pivotal connection method for producing different sized gaps between the abutment portion (13) and the engagement surface (42). In other words, the cam (14) and the abutment portion (13) form a cam cleat, and the engagement surface (42) is formed by at least one ratchet for providing better friction of the engagement surface (42) for retardation and stop, and the first engagement portion (44) is formed by a plurality of convex teeth surrounding an outer side of the cam (14).

The elastic member (15) is a torsion spring installed between the side panel (11) and the cam (14) for swinging the engagement surface (42) in a direction towards the abutment portion (13) to clamp the rope (100) situated between the abutment portion (13) and the engagement surface (42).

The rotatable start portion (16) is configured to be corresponsive to an end of the cam (14) and pivotally coupled to an end of an inner side one of the side panels (11) and swings between a third position and a fourth position, and an end of the start portion (16) has a second engagement portion (62) configured to be corresponsive to the first engagement portion (44), wherein the second engagement portion (62) is formed by a plurality of convex teeth surrounding an outer side of the start portion (16), and the other end of the start portion (16) has a force applying portion (64) extended and exposed from the housing (12). By the connection method of the first engagement portion (44) and the second engagement portion (62), the rotating directions of the cam (14) and the start portion (16) are opposite to each other.

Figure 3:
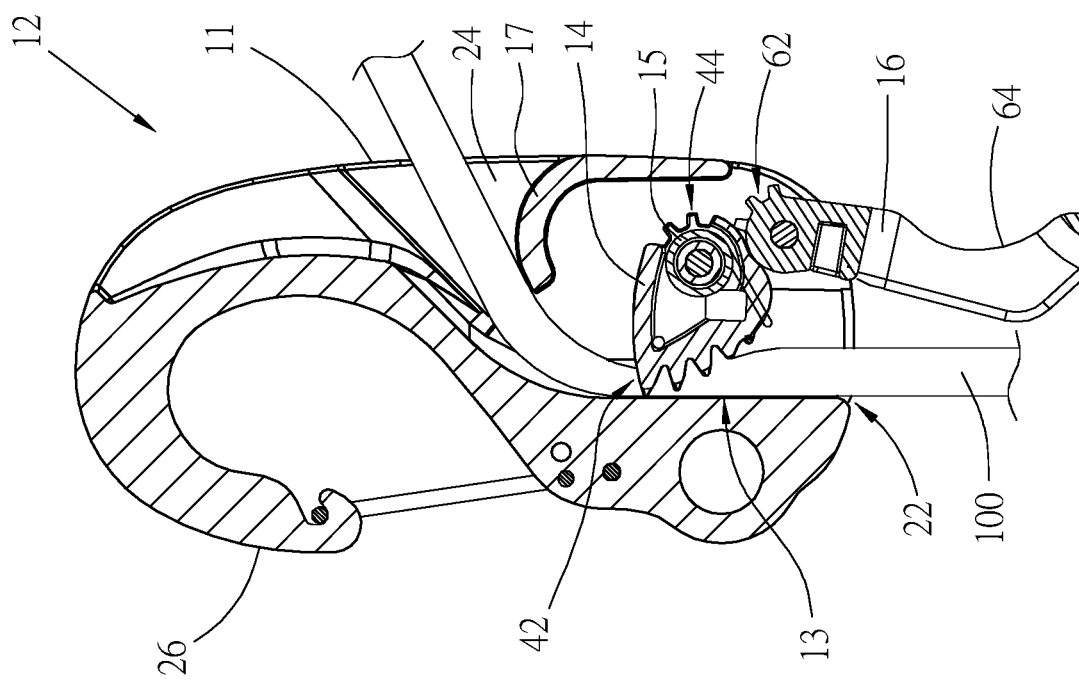
FIG. 3 is a front view showing a rope passing into the apparatus of FIG. 2.

The cam (14) and the start portion (16) are positioned as follows:

In FIG. 3, the force applying portion (64) of the start portion (16) is driven to the third position by an external force. For example, a force is applied to the force applying portion (64) by hands, so that the engagement surface (42) of the cam (14) swings in a direction opposite to the abutment portion (13), and the engagement surface (42) disposed at the first position is provided to allow the rope (100) to pass and move freely into the channel situated between the engagement surface (42) and the abutment portion (13).

Figure 4:
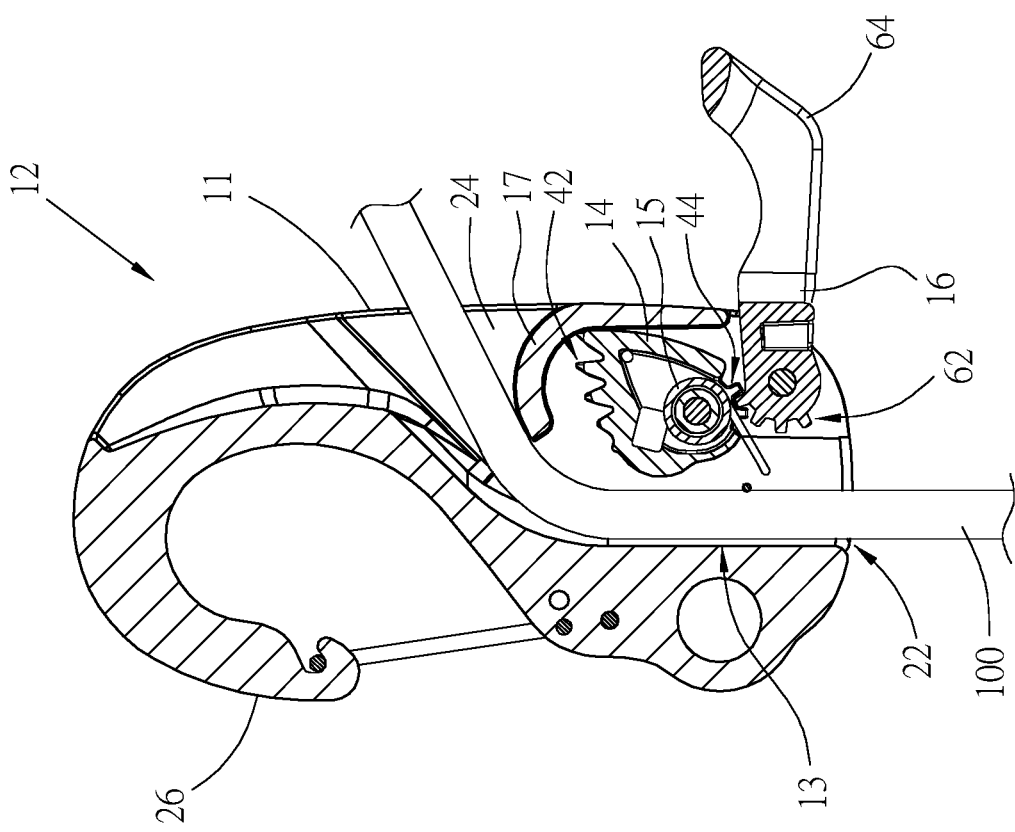
FIG. 4 is a front view showing an apparatus with the engagement surface situated at a second position and the start portion situated at a fourth position in accordance with a preferred embodiment of the present invention.

FIG. 4 shows subsequent movements of FIG. 3, when no external force is applied to the start portion (16), the elastic member (15) swings the engagement surface (42) of the cam (14) towards the abutment portion (13), so that the engagement surface (42) is situated at the second position and linked with the start portion (16) situated at the fourth position for clamping a section of the rope (100) situated at the channel by the engagement surface (42) and the abutment portion (13), but allowing the rope (100) situated at the channel to slide in a single direction (for example, the profile of the ratchet of the engagement surface (42) is in an arc shape or an oblique surface as shown in the figure, and the rope (100) can slide in the direction towards the opening (24) only).

In the aforementioned embodiment, the present invention can fix an end of a rope timely and tie an object on a truck, or fix a boat situated at the other end of the rope.

With reference to FIGS. 1 to 4 and 5 to 7 for an apparatus for timely and securely locking and releasing a rope in accordance with the present invention, the apparatus further comprises a seat (17) configured to be corresponsive to the other end of the cam (14) and installed to an inner side of one of the side panels (11).

In the embodiment as shown in FIG. 5, the rope (100) disposed at a side of the opening (24) abuts against a side of the seat (17), and then the rope (100) is passed through a through hole (641) of the force applying portion (64), so that the rope (100) can be bent inside the housing (12) and supported, and the rope (100) can be entered/retracted into/from the same side of the housing (12), and both ends of the rope (100) receive the external force from the same side. Such arrangement provides a better auxiliary tool for hanging and lifting a heavy object. Particularly, if the seat (17) is a pulley, the present invention will give a labor saving effect. In other words, if the apparatus of the present invention is fixed to a high position and the other section of the rope (100) has a load (for example, an end of the rope (100) situated at the opening (22) is connected with a heavy object), then we can apply a force downwardly to pass a section of the rope (100) through the through hole (641) of the force applying portion (64) and then lift the heavy object safely. If we release the force or let the rope (100) go, the engagement surface (42) and the abutment portion (13) will clamp the rope (100) immediately to prevent the heavy object from falling down or causing accidents.

With the design of the through hole (641) of the force applying portion (64), we can use an end of the rope (100) to control the start portion (16) from a remote end to link the clamping of the engagement surface (42) of the cam (14).

Figure 7:
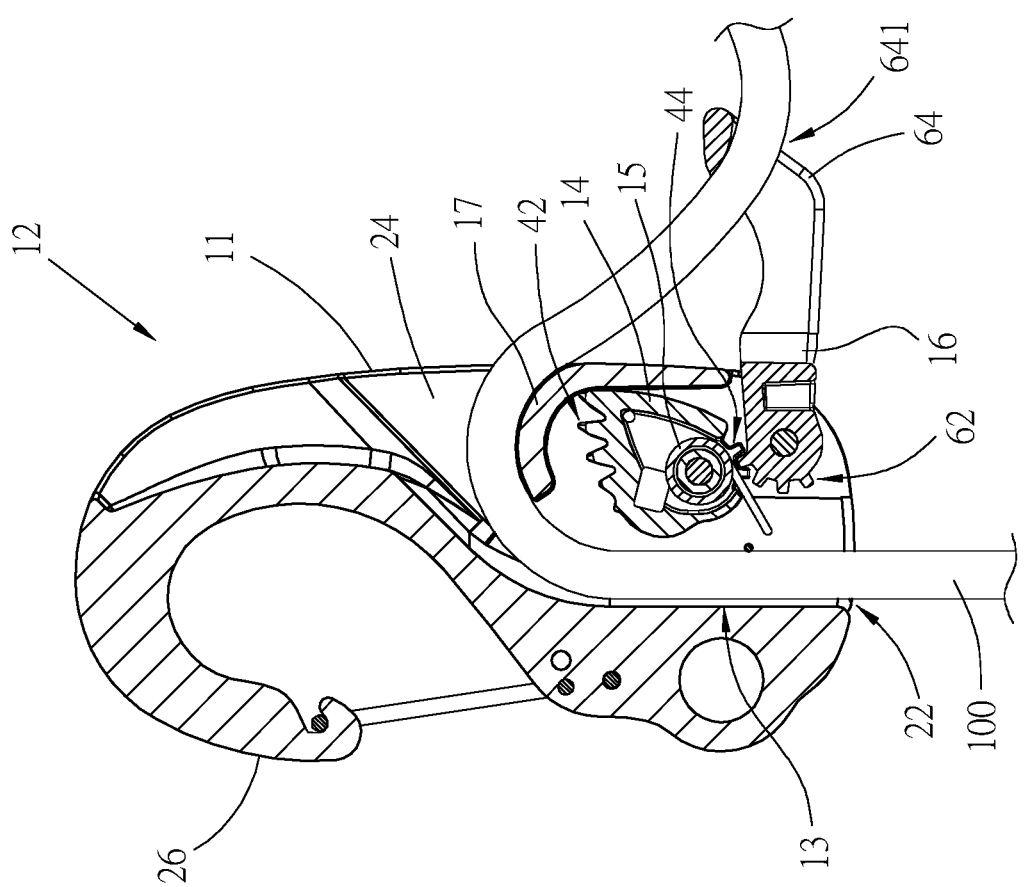
FIG. 7 is a front view showing the rope of FIG. 5 forced to deflect the engagement surface situated at the first position and the start portion situated at the third position.

In the force applying method as shown in FIGS. 6 and 7, we can timely, easily and safely unload the heavy object. In other words, we can appropriately swing and apply a force to pass a section of the rope (100) through the through hole (641) of the force applying portion (64) and simultaneously release the rope (100) to unload the heavy object. The clamping force between the engagement surface (42) and the abutment portion (13) can be changed by the angle of swinging the start portion (16), so that the heavy object of the rope (100) can be released smoothly. Even if the rope (100) is not held properly, the engagement surface (42) and the abutment portion (13) will clamp the rope (100) immediately to prevent the heavy object from falling down or causing accidents.

In the apparatus for timely and securely locking and releasing a rope of the present invention, the engagement surface (42) is formed by at least one oblique ratchet, so that the invention further provides an effect of clamping the rope (100) to slide in a single direction.

In the apparatus for timely and securely locking and releasing a rope of the present invention, the abutment portion (13) is formed by at least one oblique ratchet (not shown in the figure), so that the invention further provides an effect of clamping the rope (100) to slide in a single direction.

The apparatus for timely and securely locking and releasing a rope of the present invention has the following advantages:

The second engagement portion (62) of the start portion (16) is engaged with of the first engagement portion (44) of the cam (14) by the design of concave and convex teeth, so as to provide a better linkage effect.

The rope (100) with force applied thereto is exposed from the housing (12), so that the assembling of the rope (100) to the through hole (641) of the force applying portion (64) is convenient.

The second engagement portion (62) of the start portion (16) is engaged with the first engagement portion (44) of the cam (14), and the seat (17) and the cam (14) are arranged at relative position as shown in FIGS. 3 and 7, and this design can prevent the rope (100) from contacting the engagement surface (42) effectively, so as to provide a more smooth operation of sliding or releasing the rope (100).

The figures of this invention disclose a design of the engagement surface (42) formed by a plurality of ratchets with increasing length from bottom to top or a plurality of ratchets with increasing lengths from bottom to top and extending outward, and this design can prevent the rope (100) from touching the engagement surface (42) effectively, so as to provide a more smooth operation of sliding or releasing the rope (100). In other words, the present invention still can effectively hang and release a heavy object with a weight approximately equal to 1.25 Kg.

Figure 8:
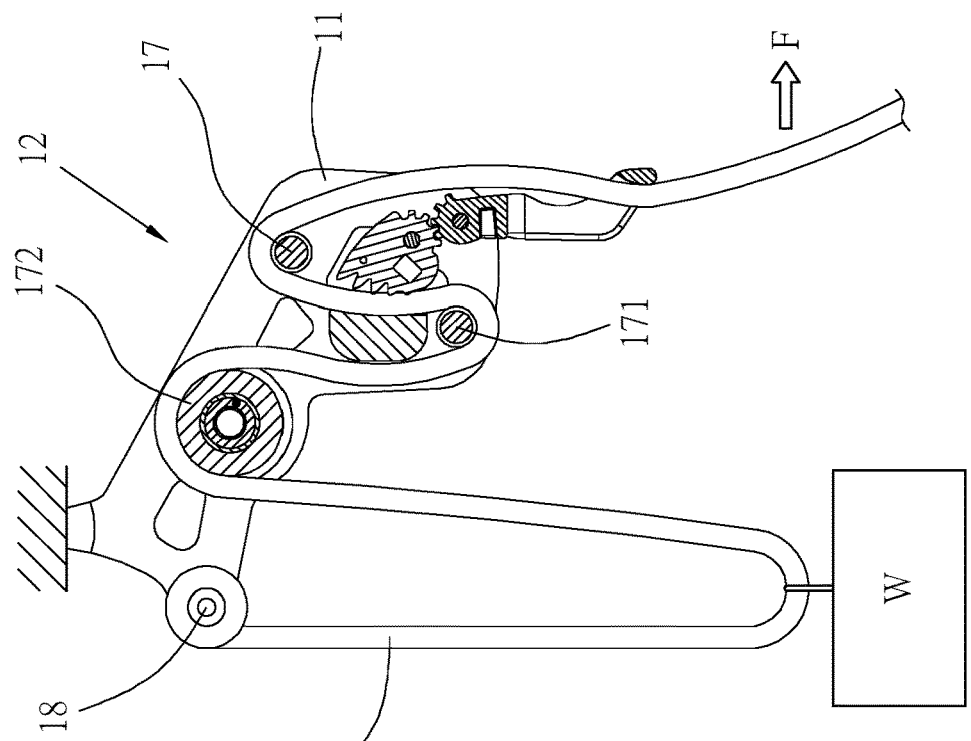
FIG. 8 is a front view of an apparatus in accordance with a second preferred embodiment of the present invention after a side panel is cut, and an object is hanged by using the apparatus.

Compared with the first embodiment of the present invention as described above, the second embodiment of the present invention as shown in FIG. 8 increases the size of the side panel (11) and adds two seats (171, 172) and a rope fixing column (18) in the housing (12), wherein the seat (172) is a pulley, and the rope fixing column (18) is provided for fixing an end of the rope (100), so that the rope (100) can be passed and installed according to the method as shown in FIG. 8 to provide a labor saving effect for hanging an object.

Figure 9:
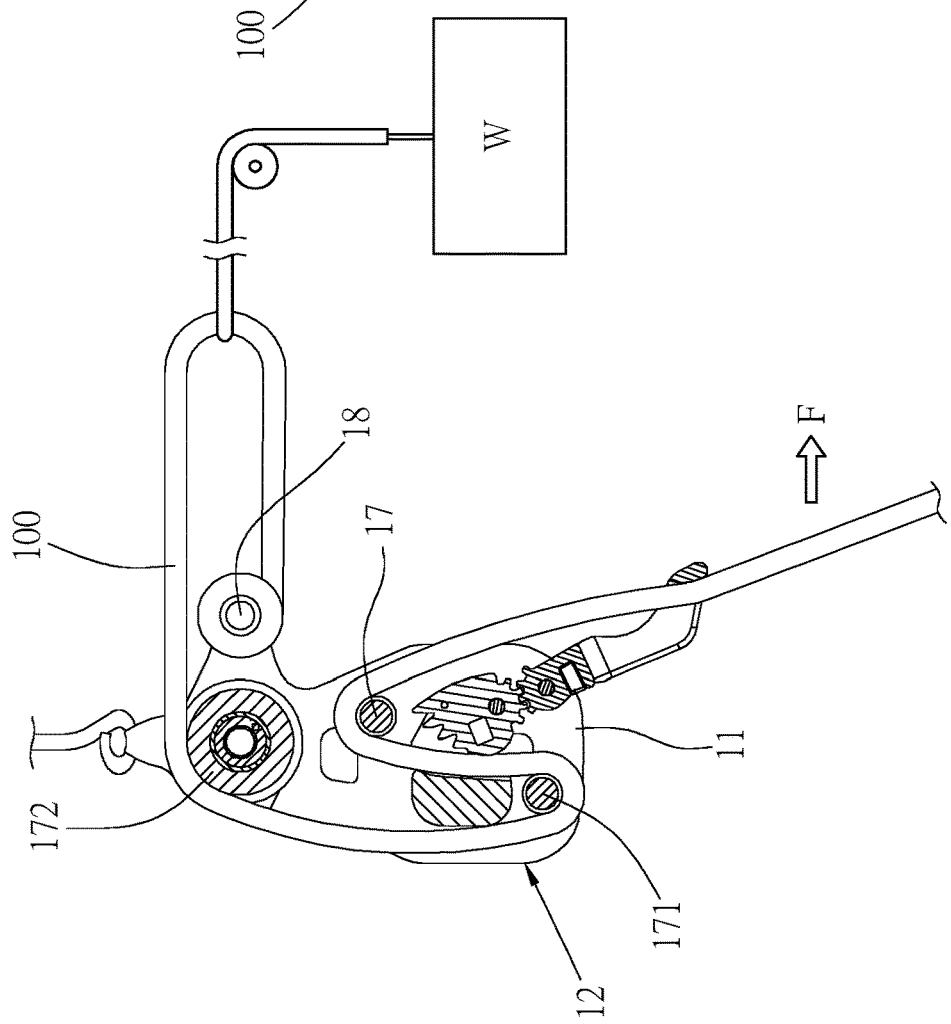
FIG. 9 is a front view of an apparatus in accordance with a third preferred embodiment of the present invention after a side panel is cut, and an object is hanged by using the apparatus.

In the third embodiment of the present invention as shown in FIG. 9, the components are the same as those shown in FIG. 8, but their installation positions are different.

Figure 10:
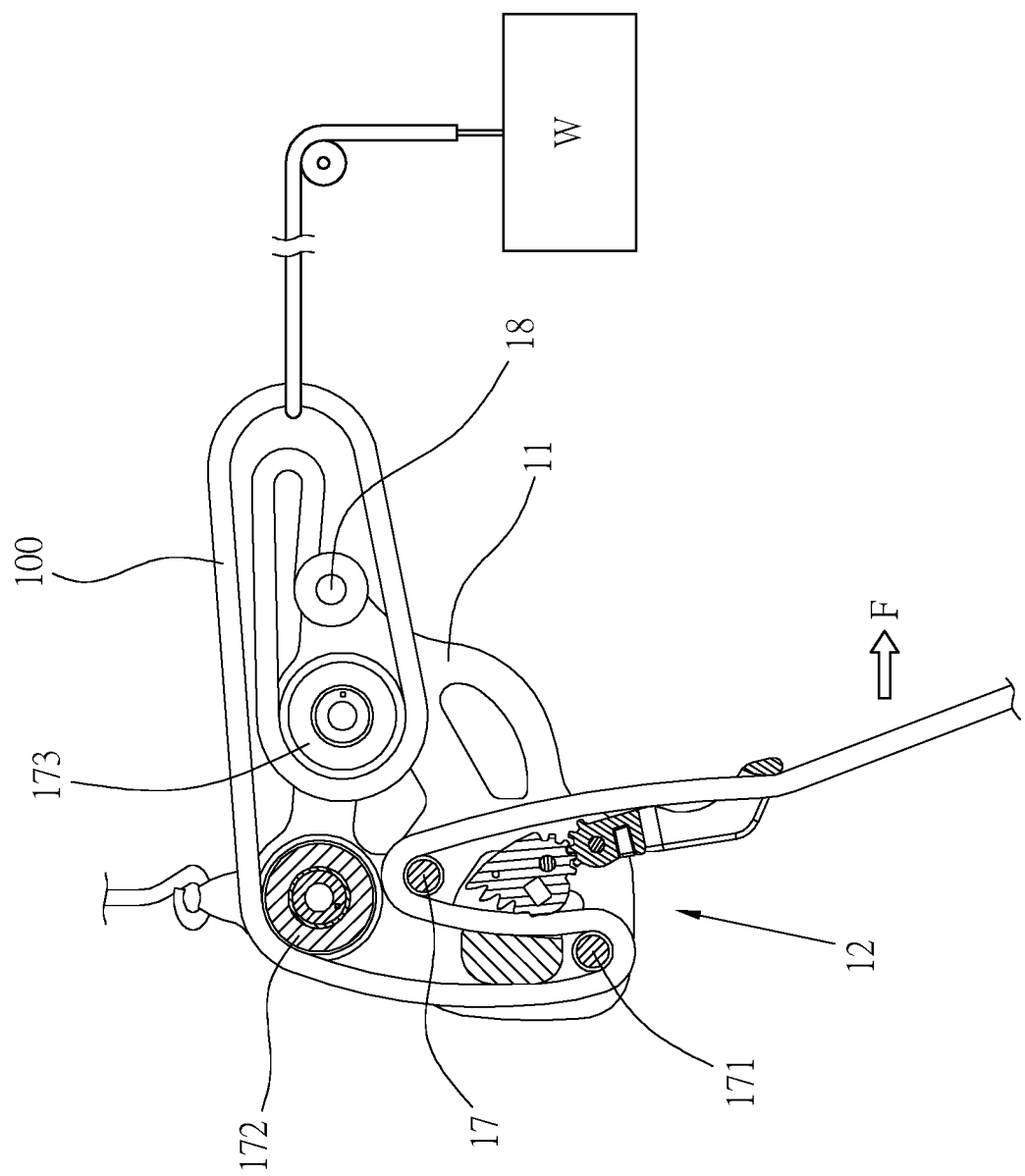
FIG. 10 is a front view of an apparatus in accordance with a fourth preferred embodiment of the present invention after a side panel is cut, and an object is hanged by using the apparatus.

In the third embodiment of the present invention as shown in FIG. 10, an additional seat (173) is provided to provide a labor saving effect, wherein the seat (173) can be a pulley.

What is claimed is:

1. An apparatus for timely and securely locking and releasing a rope, comprising:

a housing, having an interior space, and being formed of being selecting from a group consisting of any two corresponding side panels coupled with each other and two integrally formed side panels, for attaching a support portion;

a communication portion, including two openings formed on the housing, for entering/retracting the rope into/from the housing;

an abutment portion, fixed into the interior space of the housing;

a cam being rotatable, configured to be corresponsive to the abutment portion and pivotally coupled to an inner side of one of the side panels, and including an engagement surface and a first engagement portion, and the engagement surface partitioned correspondingly with the abutment portion and swinging between a first position and a second position, and the first engagement portion being disposed at an end of the cam;

an elastic member, installed between the side panel and the cam, for approaching and swinging the engagement surface in a direction towards the abutment portion;

a start portion being rotatable, configured to be corresponsive to an end of the cam and pivotally coupled to an end of an inner side of one of the side panels and swinging between a third position and a fourth position, and an end of the start portion has a second engagement portion engaged with the first engagement portion for keeping rotating directions of the cam and the start portion opposite to each other, and the other end of the start portion having a force applying portion extended and exposed from the housing;

wherein, the cam and the start portion are positioned as follows:

(A) when the force applying portion of the start portion is driven to the third position by an external force, the force applying portion swings in a direction opposite to the abutment portion to link the engagement surface of the cam to swing in a direction opposite to the abutment portion, so that the engagement surface is situated at the first position to allow the rope to pass through and move freely in a channel between the engagement surface and the abutment portion; and (B) when no external force is exerted on the cam and the start portion, the elastic member drives the engagement surface of the cam to approach and swing in a direction towards the abutment portion, so that the engagement surface is situated at the second position and linked to the start portion situated at the fourth position to clamp the rope situated in the channel by the engagement surface and the abutment portion.

2. The apparatus for timely and securely locking and releasing a rope as claimed in claim 1, further comprising a seat configured to be corresponsive to the other end of the cam and installed to an inner side of one of the side panels for abutting a side of the seat by the rope.

3. The apparatus for timely and securely locking and releasing a rope as claimed in claim 2, wherein the force applying portion has a through hole for passing and install the rope in the opening.

4. The apparatus for timely and securely locking and releasing a rope as claimed in claim 1, wherein at least one ratchet is the form of being selected from a group consisting of the abutment portion, the engagement surface, and a combination thereof.

5. The apparatus for timely and securely locking and releasing a rope as claimed in claim 2, wherein at least one ratchet is the form of being selected from a group consisting of the abutment portion, the engagement surface, and a combination thereof.

6. The apparatus for timely and securely locking and releasing a rope as claimed in claim 3, wherein at least one ratchet is the form of being selected from a group consisting of the abutment portion, the engagement surface, and a combination thereof.

7. The apparatus for timely and securely locking and releasing a rope as claimed in claim 1, wherein the cam is eccentrically and pivotally connected to the one of the side panels.

8. The apparatus for timely and securely locking and releasing a rope as claimed in claim 2, wherein the cam is eccentrically and pivotally connected to the one of the side panels.

9. The apparatus for timely and securely locking and releasing a rope as claimed in claim 3, wherein the cam is eccentrically and pivotally connected to the one of the side panels.

10. The apparatus for timely and securely locking and releasing a rope as claimed in claim 1, wherein the first engagement portion is formed by a plurality of convex teeth surrounding an outer side of the cam, and the second engagement portion is formed by a plurality of convex teeth surrounding an outer side of the start portion.

11. The apparatus for timely and securely locking and releasing a rope as claimed in claim 2, wherein the first engagement portion is formed by a plurality of convex teeth surrounding an outer side of the cam, and the second engagement portion is formed by a plurality of convex teeth surrounding an outer side of the start portion.

12. The apparatus for timely and securely locking and releasing a rope as claimed in claim 3, wherein the first engagement portion is formed by a plurality of convex teeth surrounding an outer side of the cam, and the second engagement portion is formed by a plurality of convex teeth surrounding an outer side of the start portion.

13. The apparatus for timely and securely locking and releasing a rope as claimed in claim 1, wherein the elastic member is a torsion spring.

14. The apparatus for timely and securely locking and releasing a rope as claimed in claim 2, wherein the elastic member is a torsion spring.

15. The apparatus for timely and securely locking and releasing a rope as claimed in claim 3, wherein the elastic member is a torsion spring.

16. The apparatus for timely and securely locking and releasing a rope as claimed in claim 1, wherein the rope is configured to move through the channel in a single direction under the position of the engagement surface and the start portion are respectively at the second position and the fourth position.

17. The apparatus for timely and securely locking and releasing a rope as claimed in claim 2, wherein the rope is configured to move through the channel in a single direction under the position of the engagement surface and the start portion are respectively at the second position and the fourth position.

18. The apparatus for timely and securely locking and releasing a rope as claimed in claim 3, wherein the rope is configured to move through the channel in a single direction under the position of the engagement surface and the start portion are respectively at the second position and the fourth position.

* * * * *